(12) United States Patent
Van Essen et al.

(10) Patent No.: US 10,953,479 B2
(45) Date of Patent: *Mar. 23, 2021

(54) ACCESSORY TOOL

(71) Applicant: Milwaukee Electric Tool Corporation, Brookfield, WI (US)

(72) Inventors: James Van Essen, Wauwatosa, WI (US); Douglas W. Allen, Oconomowoc, WI (US); Brett Parendo, Milwaukee, WI (US); Michael J. Zimmermann, New Berlin, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,819

(22) Filed: Jun. 4, 2019

(65) Prior Publication Data
US 2019/0314905 A1  Oct. 17, 2019

Related U.S. Application Data

(63) Continuation of application No. 15/373,623, filed on Dec. 9, 2016, now Pat. No. 10,421,130.

(Continued)

(51) Int. Cl.
  *B23B 51/12* (2006.01)
  *B23B 51/00* (2006.01)
  (Continued)

(52) U.S. Cl.
  CPC .......... *B23B 51/009* (2013.01); *B23B 31/005* (2013.01); *B23B 51/0081* (2013.01);
  (Continued)

(58) Field of Classification Search
  CPC .............. B23B 51/009; B23B 51/0081; B23B 2251/02; B23B 2251/62
  See application file for complete search history.

(56) References Cited

U.S. PATENT DOCUMENTS

| 2,851,295 A | 9/1958 | Chaffee |
| 2,936,010 A | 5/1960 | Ansingh |

(Continued)

FOREIGN PATENT DOCUMENTS

| DE | 202011106232 U1 | 11/2011 |
| DE | 102012224437 A1 | 7/2014 |

(Continued)

OTHER PUBLICATIONS

European Patent Office Search Report for Application No. 16873882.1 dated Jun. 17, 2019, 6 pages.

(Continued)

*Primary Examiner* — Alan Snyder

(74) *Attorney, Agent, or Firm* — Michael Best & Friedrich LLP

(57) ABSTRACT

An accessory tool includes an adapter end having a maximum outer dimension, and a shank coupled to the adapter end. The shank includes a tool engagement portion including a cross section having a maximum outer width, a first reduced portion disposed between the tool engagement portion and the adapter end and having a first minimum outer dimension and a first length, and a second reduced portion formed in the tool engagement portion between the first reduced portion and an end of the shank. The second reduced portion is engaged by the tool to secure the shank to the tool, and has a second minimum outer dimension and a second length. The maximum outer dimension is greater than the maximum outer width. The maximum outer width is greater than the first minimum outer dimension and greater the second minimum outer dimension. The first length is greater than the second length.

20 Claims, 2 Drawing Sheets

Related U.S. Application Data

(60) Provisional application No. 62/265,903, filed on Dec. 10, 2015.

(51) Int. Cl.
  *B23B 31/00* (2006.01)
  *B25B 15/00* (2006.01)
  *B23P 15/28* (2006.01)

(52) U.S. Cl.
  CPC ............ *B23P 15/28* (2013.01); *B25B 15/001* (2013.01); *B23B 2231/0232* (2013.01); *B23B 2231/0252* (2013.01); *B23B 2251/02* (2013.01); *B23B 2251/62* (2013.01)

(56) References Cited

U.S. PATENT DOCUMENTS

| | | |
|---|---|---|
| 4,127,355 A | 11/1978 | Oakes |
| 4,436,005 A | 5/1984 | Hanson |
| 4,750,750 A | 6/1988 | Batalorf, Jr. |
| 5,568,757 A | 10/1996 | Lewis |
| 5,752,418 A | 5/1998 | Robins |
| 5,868,047 A | 2/1999 | Faust et al. |
| 5,950,507 A | 9/1999 | Wolfe |
| 8,418,587 B2 | 4/2013 | DeBaker |
| 8,800,407 B2 | 8/2014 | DeBaker |
| 8,893,365 B2 | 11/2014 | Fanourgiakis et al. |
| 8,893,372 B2 | 11/2014 | Fanourgiakis et al. |
| 9,132,534 B2 | 9/2015 | Lai |
| 2004/0076483 A1 | 4/2004 | Singh et al. |
| 2005/0278926 A1 | 12/2005 | Moore et al. |
| 2009/0049959 A1 | 2/2009 | Gibbs |
| 2010/0037734 A1 | 2/2010 | Kozak et al. |
| 2011/0197721 A1 | 8/2011 | DeBaker |
| 2011/0283842 A1 | 11/2011 | Lai |
| 2012/0060656 A1 | 3/2012 | Chang |
| 2012/0074659 A1 | 3/2012 | Fanourgiakis et al. |
| 2012/0207557 A1 | 8/2012 | Durfee |
| 2012/0275875 A1 | 11/2012 | Gischus et al. |
| 2014/0023445 A1 | 1/2014 | Allen |
| 2014/0311302 A1 | 10/2014 | Taguchi et al. |
| 2014/0318328 A1 | 10/2014 | DeBaker |
| 2015/0000475 A1 | 1/2015 | Meholovitch |
| 2015/0020652 A1 | 1/2015 | Wong |

FOREIGN PATENT DOCUMENTS

| | | |
|---|---|---|
| SU | 1357151 A1 | 12/1987 |
| WO | 2014015140 A1 | 1/2014 |

OTHER PUBLICATIONS

International Search Report and Written Opinion for Application No. PCT/2016/065724 dated Apr. 3, 2017 (13 pages).
Chinese Patent Office Action for Application No. 201690001499.0 dated Jan. 16, 2019 (5 pages, English translation included).
Extended European Patent Office Search Report for Application No. 16873882.1 dated Jun. 17, 2019 (6 pages).

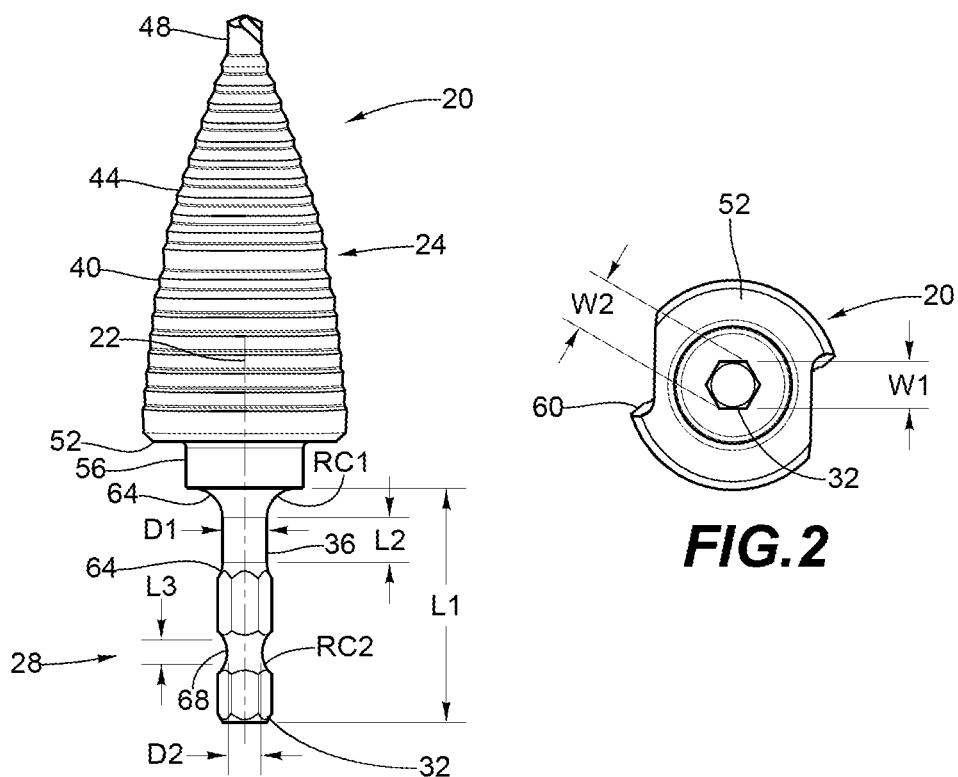
FIG.1
FIG.2
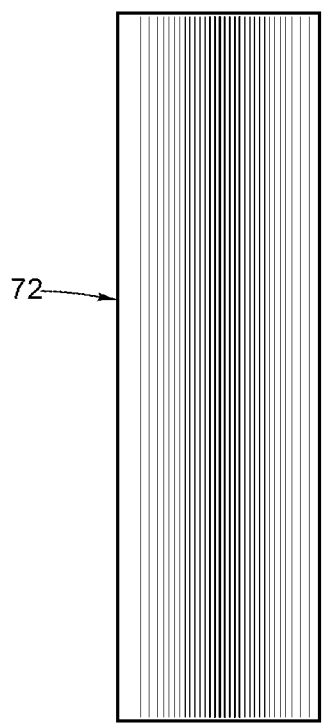
FIG.3
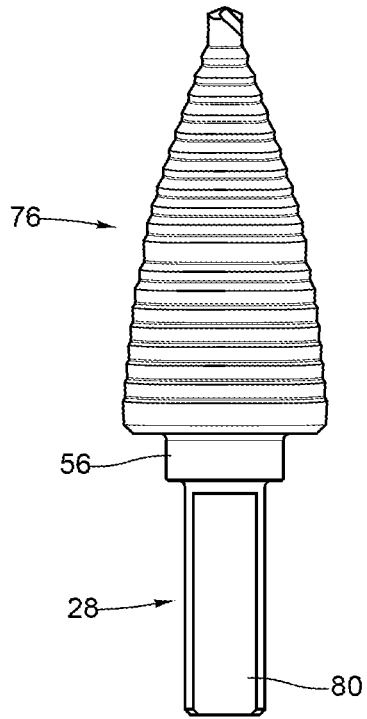
FIG.4

ACCESSORY TOOL

CROSS-REFERENCE TO RELATED APPLICATIONS

This application is a continuation of U.S. patent application Ser. No. 15/373,623, filed Dec. 9, 2016, now U.S. Pat. No. 10,421,130, which claims priority to U.S. Provisional Patent Application No. 62/265,903, filed on Dec. 10, 2015, the entire contents of which are incorporated herein by reference.

FIELD OF THE INVENTION

The present invention relates to accessory tools, and more particularly to accessory tool shanks.

SUMMARY OF THE INVENTION

The invention provides, in one aspect, an accessory tool including an effector end and a shank coupled to the effector end. The shank includes a tool engagement portion that is configured to be received within a tool and a reduced diameter portion disposed between the tool engagement portion and the effector end. The shank defines a first length, and the reduced diameter portion defines a second length that is 10% to 45% of the first length.

The invention provides, in another aspect, a method for manufacturing an accessory tool from a piece of stock metal. The method includes cutting a tool form from the stock metal. The tool form includes an effector end and a shank having a tool engagement portion. The shank has a first length. The method also includes removing material from a portion of the shank adjacent the effector end to form a reduced diameter portion between the tool engagement portion and the effector end. The reduced diameter portion defines a second length that is 10% to 45% of the first length.

The invention provides, in another aspect, a shank for an accessory tool. The shank includes a tool engagement portion that is configured to be received within a tool. The shank also includes a reduced diameter portion adjacent the tool engagement portion. The reduced diameter portion is configured to be coupled to an effector end of the accessory tool. The shank defines a first length, and the reduced diameter portion defines a second length that is 10% to 45% of the first length.

Other features and aspects of the invention will become apparent by consideration of the following detailed description and accompanying drawings.

BRIEF DESCRIPTION OF THE DRAWINGS

FIG. 1 is a side view of an accessory tool.
FIG. 2 is a bottom view of the accessory tool of FIG. 1.
FIG. 3 is a side view of a piece of stock metal.
FIG. 4 is a side view of a partially formed accessory tool.

Figures 5, 6:
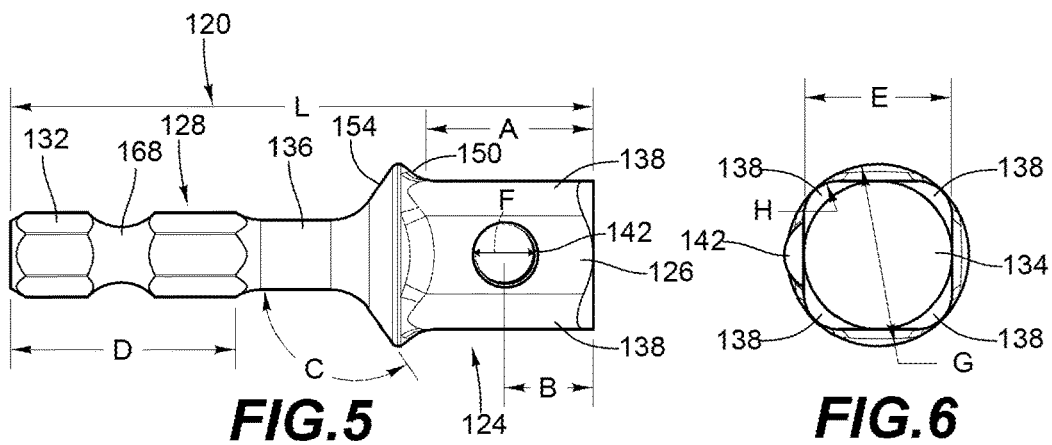
FIG. 5 is a side view of an accessory tool according to another embodiment of the invention.
FIG. 6 is an end view of the accessory tool of FIG. 5.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As used herein with reference to dimensions, the terms "approximately" and "about" mean within normal manufacturing tolerances of the product. Further, the term "approximately" with reference to other values means within a rounded numerical value.

DETAILED DESCRIPTION

FIGS. 1-11 illustrate accessory tools 20, 120, 220, 320 (e.g., a step drill bit 20 and socket adapters 120, 220, 320) that each include an effector end 24, 124, 224, 324 coupled to a shank 28, 128, 228, 328. Each shank 28, 128, 228, 328 includes a tool engagement portion 32, 132, 232, 332 and a reduced diameter portion 36, 136, 236, 336. As will be explained below, the reduced diameter portion 36, 136, 236, 336 removes localized regions of high stress and discontinuities, thereby increasing the durability of the shank 28, 128, 228, 328 to extend the operational lifetime of the accessory tools 20, 120, 220, 320.

With reference to FIGS. 1 and 2, the effector end or step drill 24 includes a generally conically shaped body 40 having a series of stepped shoulders 44 that increase in diameter from a tip portion 48 to a base portion 52, which includes a base shoulder 56. At least one angled or spiral cut flute 60 (FIG. 2) extends from the tip portion 48 to the base portion 52. Cutting edges are defined at the intersections of the flute 60 and each shoulder 44.

With continued reference to FIG. 1, the shank 28 is either permanently or removably coupled to the base portion 52 of the body 40 and extends a length L1 measured from the base portion 52 to the end of the tool engagement portion 32. The length L1 is approximately 31.75 mm in the illustrated embodiment, but may be between about 20-40 mm in other embodiments. As noted above, the shank 28 includes the tool engagement portion 32 and the reduced diameter portion 36.

The tool engagement portion 32 is configured to interface with a tool (e.g., power drill, hand tool, screw driver, etc.), and is disposed on an end of the shank 28 opposite the effector end 24. The tool engagement portion 32 may have a hexagonal, circular, or other standard shaped cross section configured to be received by standard tool couplings (e.g., chuck, collet, etc.). In the illustrated example, the tool engagement portion 32 has a hexagonal cross section and has a first width W1 (FIG. 2) measured between a pair of opposed flat sides. In some embodiments, the first width W1 is between approximately 6 to 8 mm. In further embodiments, the first width W1 is about 6.35 mm. Additionally, the shank 28 includes a second width W2 measured between a pair of opposed corners. In some embodiments, the second width W2 is between approximately 6.5 to 8.5 mm. In further embodiments, the second width W2 is about 7 mm.

With reference to FIG. 1, the reduced diameter portion 36 is disposed between the tool engagement portion 32 and the base shoulder 56, and is substantially adjacent to and contiguous with the base shoulder 56. In the illustrated embodiment, the reduced diameter portion 36 has a diameter D1 of approximately 6 mm. In another embodiment, the reduced diameter portion 36 has a diameter D1 between 4.5 mm and 6.2 mm. In yet another embodiment, the reduced diameter portion 36 has a diameter D1 between approximately 5 mm and 6.1 mm. In yet another embodiment, the reduced diameter portion 36 has a diameter D1 between approximately 5.5 mm and 6.1 mm. In yet another embodiment, the reduced diameter portion 36 has a diameter D1 between approximately 5.8 mm and 6.1 mm. Alternatively, the diameter D1 may be approximately between 70%-98% of the first width W1. More specifically, the diameter D1 may be approximately between 85%-96% of the first width W1. Still more specifically, the diameter D1 may be approximately between 90%-95% of the first width W1.

The reduced diameter portion 36 extends along a longitudinal length L2 of the shank 28. In the illustrated embodiment the longitudinal length L2 is approximately 6 mm. In another embodiment, the longitudinal length L2 may be less than approximately 25 mm. In another embodiment, the longitudinal length L2 may be between approximately 4 mm and 8 mm. In yet another embodiment, the longitudinal length L2 may be between approximately 5 mm and 7 mm. Alternatively, the longitudinal length L2 may be between approximately 10% and 30% of the length of the shank 28. More specifically, the longitudinal length L2 may be between approximately 15% and 22% of the length L1 of the shank 28. Still more specifically, the longitudinal length L2 may be between approximately 18% and 20% of the length L1 of the shank 28. Still more specifically, the longitudinal length L2 may be approximately 19% of the length L1 of the shank 28. As another alternative, the longitudinal length L2 may be between approximately 2.5% to 15% of an entire length of the accessory tool 20. More specifically, the longitudinal length L2 may be between approximately 5% and 10% of the entire length of the accessory tool 20. Still more specifically, the longitudinal length L2 may be between approximately 7% and 8% of the entire length of the accessory tool 20.

The reduced diameter portion 36 further includes a fillet 64 on either end contiguous with the shank 28 and base shoulder 56. In the illustrated embodiment, the fillets 64 have a radius of curvature RC1 of approximately 4 mm. In another embodiment, the radius of curvature RC1 may be between approximately 3 mm and 5 mm. In yet another embodiment, the radius of curvature RC1 may be between approximately 3.25 mm and 4.75 mm. In yet another embodiment, the radius of curvature RC1 may be between approximately 3.5 mm and 4.5 mm.

Still referring to FIG. 1, the shank 28 further includes a second reduced diameter portion 68 disposed between the reduced diameter portion 36 and the tool engagement portion 32. The second reduced diameter portion 68 is configured to be engaged by a mechanism of a tool (e.g., a ball detent) to secure the shank 28 to the tool. The second reduced diameter portion 68 has a longitudinal length L3 that is less than L2 and a diameter D2 that is substantially similar to D1, as shown in FIG. 1. In other embodiments, the second reduced diameter portion 68 may have dimensional characteristics L3, D2, and RC2 that are substantially similar to, greater than, or less than L2, D1, and RC2, respectively. In other embodiments, the second reduced diameter portion 68 may be omitted.

In one embodiment, the shank 28 may be induction tempered in order to disperse stress risers in the shank 28 material, thereby increasing the toughness and decreasing the hardness of the shank 28. By only treating the shank 28, the body 40 of the step drill bit 20 remains hard and suitable for cutting a workpiece.

With reference to FIGS. 3 and 4, the step drill bit 20 described with respect to FIGS. 1 and 2 may be manufactured from a piece of stock metal 72 (FIG. 3) according to the following exemplary method. In a first step, the stock metal 72 of FIG. 3 is cut into an initial step drill bit form 76 of FIG. 4 using, for example, a lathe (e.g., single point cutting lathe). Either prior to, during, or after the first step, flat sections 80 are carved into the step drill bit form 76 at a location corresponding to the shank 28 in order to form the hexagonally shaped shank 28 and therefore the tool engagement portion 32 illustrated in FIG. 1. In a subsequent step, a portion of the shank 28 adjacent to the base shoulder 56 is cut or rounded into the reduced diameter portion 36 (e.g., by turning, grinding with an abrasive wheel, etc.). Additionally, in some embodiments, a second reduced diameter portion 68 may be formed in a similar fashion between the reduced diameter portion 36 and the tool engagement portion 32. In some embodiments, the step drill bit 20 may be hardened (e.g., heat treated, coated, etc.) prior to forming the reduced diameter portion 36.

Figure 7:
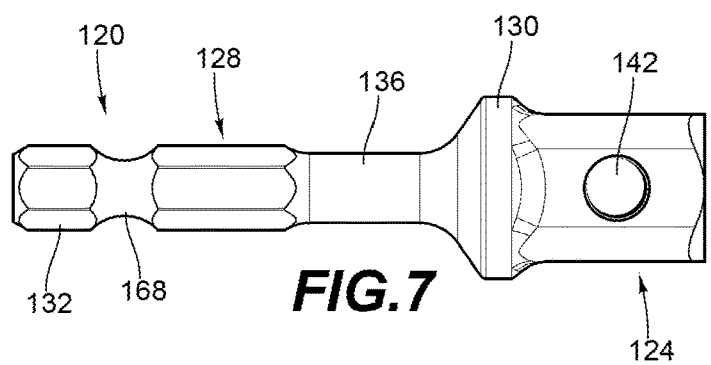
FIG. 7 is another side view of the accessory tool of FIG. 5.

FIGS. 5-7 illustrate another accessory tool. In this embodiment of the invention, the accessory tool is a socket adapter 120 that includes an effector end or adapter end 124 and a shank 128 having a tool engagement portion 132, a first reduced diameter portion 136, and a second reduced diameter portion 168. The shank 128 of this embodiment illustrated in FIGS. 5-7 is similar to the shank 128 described above with reference to FIGS. 1-4. The following description will focus on the differences between the socket adapter 120 and step drill bit 20 described above.

With continued reference to FIGS. 5-7, the socket adapter 120 includes the adapter end 124 having a body portion 126 and a base portion 130 contiguous with the shank 128 and delimiting the adapter end 124. The body portion 126 has a cylindrical section 134 extending away from the base portion 130 that has four rounded protrusions 138 extending a distance H radially outward from an outer extent of the cylindrical section 134. The body portion 126 has a width E measured from an outer portion of a first protrusion 138 to the outer portion of an adjacent protrusion 138. The body portion 126 further includes an engagement mechanism in the form of at least one spring loaded ball detent 142 having a diameter F that is configured to engage corresponding features of a socket such that the socket may be detachably coupled to the socket adapter 120. However, it should be noted that this engagement mechanism is merely exemplary. Other engagement mechanisms known in the art may be used in place of the ball detent 142 illustrated in FIGS. 5-7.

As illustrated in FIG. 5, the socket adapter 120 has a total length L of approximately 50 mm (i.e., 2 inches). However, the length L may be between approximately 40 mm and 60 mm in other embodiments. In another embodiments, the length L may be up to approximately 152.4 mm (i.e., 6 inches). In yet another embodiment, the length L may be up to approximately 76.2 mm (i.e., 3 inches). The adapter end 124 has a longitudinal length A of approximately 7.5 mm, 11 mm, or 15 mm. However, in other embodiments, the length A maybe between approximately 5 mm to 17.5 mm. The ball detent 142 is located at a distance B measured from a distal end of the adapter end 124, where B is approximately 3 mm to 8 mm, or alternatively approximately 35% and 65% of the length A.

Still referring to FIG. 5, the base portion 130 of the adapter end 124 includes a wide base shoulder 146 having a diameter G and including a first fillet 150 that is continuous with the body portion 126 and a second fillet 154 that is continuous with the shank 128 to define an angle C with the shank. In some embodiments, the angle C is approximately 110°-140°. The shank 128 includes the tool engagement portion 132, the first reduced diameter portion 136, and the second reduced diameter portion 168. Together, the tool engagement portion 132 and the second reduced diameter portion 168 define a length D. In some embodiments, the length D is approximately 18 mm to 25 mm. In general, the shank 128 may have other dimensional characteristics similar to dimensional characteristics described above with respect to the shank of FIGS. 1-4. That is, the first reduced diameter portion 136 may have dimensional characteristics similar to those described above with reference to the first reduced diameter portion 36, the second reduced diameter portion 168 may have dimensional characteristics similar to those described above with reference to the second reduced diameter portion 68, the tool engagement portion 132 may have dimensional characteristics similar to those described above with reference to the tool engagement portion 32, etc.

As seen in Table 1 below, the socket adapter 120 of FIGS. 5-7 may be constructed in at least three sizes (e.g., ¼ inch, ⅜ inch, ½ inch, etc.). Examples of dimensional characteristics for the dimensions A-H described above with reference to FIGS. 5-6 are provided below. It should be noted that each dimension listed below may vary by approximately +/−30%.

TABLE 1

| PART NAME | "A" (mm) | "B" (mm) | "C" (mm) | "D" (mm) | "E" (mm) | "F" (mm) | "G" (mm) | "H" (mm) |
|---|---|---|---|---|---|---|---|---|
| SOCKET ADAPTER, ¼" | 7.5 | 3.5 | N/A | 23.80 | 6.25-6.35 | 3.18 | 7.9-8.4 | 1.0 |
| SOCKET ADAPTER, ⅜" | 11.0 | 5.5 | 125.0 | 23.80 | 9.42-9.53 | 4.78 | 12.0-12.7 | 2.5 |
| SOCKET ADAPTER, ½" | 15.0 | 7.5 | 125.0 | 19.30 | 12.59-12.70 | 6.35 | 15.6-16.8 | 3.0 |

In addition, the shank 128 of the socket adapter 120 may be formed using a similar process to the method described above with respect to FIGS. 1-4.

Figures 8, 9:
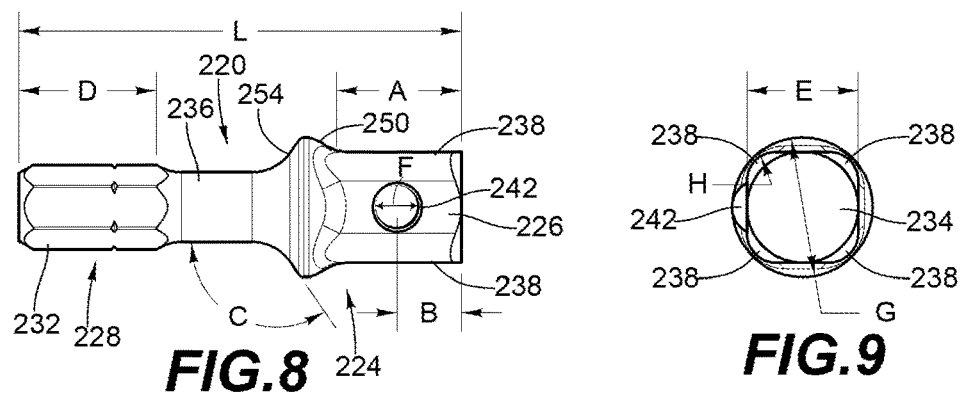
FIG. 8 is a side view of an accessory tool according to another embodiment of the invention.
FIG. 9 is an end view of the accessory tool of FIG. 8.

FIGS. 8-9 illustrate yet another accessory tool. In this embodiment of the invention, the accessory tool is another socket adapter 220 that includes an effector end or adapter end 224 and a shank 228 having a tool engagement portion 232 and a first reduced diameter portion 236. The shank 228 of the embodiment illustrated in FIGS. 8-9 is similar to the shank 128 described above with reference to FIGS. 5-7, but with the second reduced diameter portion 168 omitted. Accordingly, similar parts will be labeled with the same reference numeral plus "100." Additionally, labeled dimensions A-H refer to the same dimensions as those described above with reference to FIGS. 5-7. As seen in Table 2 below, the socket adapter 220 of FIGS. 8-9 may be constructed in at least two sizes (e.g., ¼ inch, ⅜ inch, etc.). Examples of dimensional characteristics for the dimensions A-G described above are provided below. It should be noted that each dimension listed below may vary by approximately +/−30%.

TABLE 2

| PART NAME | "A" (mm) | "B" (mm) | "C" (mm) | "D" (mm) | "E" (mm) | "F" (mm) | "G" (mm) | "H" (mm) |
|---|---|---|---|---|---|---|---|---|
| SOCKET ADAPTER, ¼" | 7.5 | 3.5 | N/A | 11.80 | 6.25-6.35 | 3.18 | 7.9-8.4 | 3.0 |
| SOCKET ADAPTER, ⅜" | 11.0 | 5.5 | 125.0 | 11.80 | 6.42-9.53 | 4.78 | 12.0-12.7 | 1.0 |

In addition, the shank 228 of the socket adapter 220 may be formed using a similar process to the method described above with respect to FIGS. 1-4.

Figures 10, 11:
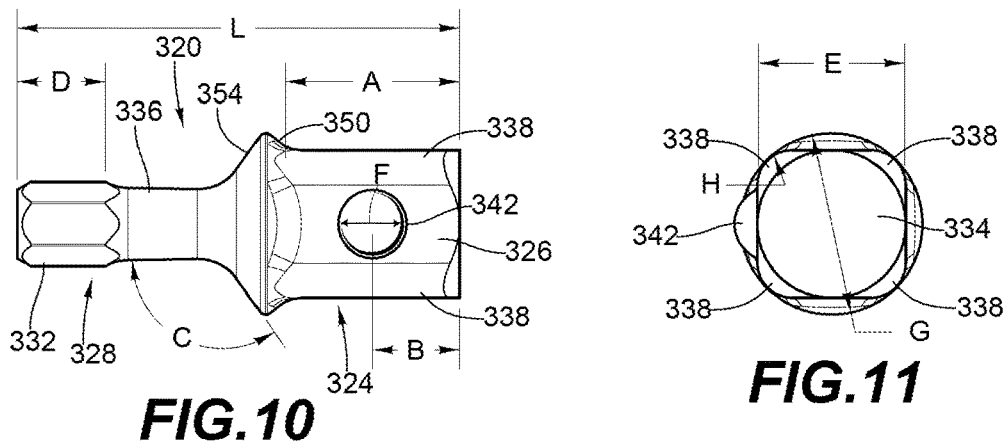
FIG. 10 is a side view of an accessory tool according to another embodiment of the invention.
FIG. 11 is an end view of the accessory tool of FIG. 10.

FIGS. 10-11 illustrate yet another accessory tool. In this embodiment of the invention, the accessory tool is another socket adapter 320 that includes an effector end or adapter end 324 and a shank 328 having a tool engagement portion 332 and a first reduced diameter portion 336. The shank 328 of the embodiment illustrated in FIGS. 10-11 is similar to the shank 128 described above with reference to FIGS. 5-7, but with the second reduced diameter portion 168 omitted. Accordingly, similar parts with be labeled with the same reference numeral plus "200." Additionally, labeled dimensions A-H refer to the same dimensions as those described above with reference to FIGS. 5-7. As seen in Table 3 below, the socket adapter 320 of FIGS. 10-11 may be constructed in at least one size (e.g., ½ inch, etc.). Examples of dimensional characteristics for the dimensions A-G described above are provided below. It should be noted that each dimension listed below may vary by approximately +/−30%.

TABLE 3

| PART NAME | "A" (mm) | "B" (mm) | "C" (mm) | "D" (mm) | "E" (mm) | "F" (mm) | "G" (mm) | "H" (mm) |
|---|---|---|---|---|---|---|---|---|
| SOCKET ADAPTER, ½" | 15.0 | 7.5 | 125.0 | 7.60 | 12.59-12.70 | 6.35 | 7.9-8.4 | 3.0 |

In addition, the shank 328 of the socket adapter 320 may be formed using a similar process to the method described above with respect to FIGS. 1-4.

The accessory tools 20, 120, 220, 320 each include shanks 28, 128, 228, 328 with tool engagement portions 32, 132, 232, 332 and reduced diameter portions 36, 136, 236, 336. As described above, the reduced diameter portions 36, 136, 236, 336 have diameters between approximately 4.5 mm and 6.2 mm and lengths between approximately 4 mm to 8 mm. In specific embodiments, the reduced diameter portions 36, 136, 236, 336 have a diameter and length of approximately 6 mm. In addition, the length of the reduced diameter portions 36, 136, 236, 336 are approximately 10-45% the length of the shanks 28, 128, 228, 328.

In operation of the accessory tool 20, 120, 220, 320, the reduced diameter portion 36, 136, 236, 336 of the shank 28, 128, 228, 328 is configured to increase the impact resistance or the toughness of the accessory tool 20, 120, 220, 320, such that the effector end 24, 124, 224, 324 of the accessory tool 20, 120, 220, 320 is allowed to elastically deform or twist relative to the shank 28, 128, 228, 328 about a central axis 22 of the accessory tool 20, 120, 220, 320. Specifically, the polar moment of inertia of the shank 28, 128, 228, 328 is decreased by incorporating the reduced diameter portion 36, 136, 236, 336, thereby reducing the amount of torsion required to elastically twist the shank 28, 128, 228, 328, compared to a configuration of the shank 28, 128, 228, 328 having a cylindrical shape (i.e., without the reduced diameter portion 36, 136, 236, 336).

Conventional accessory tools are known to break along certain portions of the shank. More specifically, they are known to break generally along the area in which the reduced diameter portion 36 and second reduced diameter portions have been added. Advantageously, the shank 28, 128, 228, 328 of the invention provides at least one reduced diameter portion 36, 136, 236, 336 having an area of consistent, low variation surface finish. In addition, stress risers are removed from this area of the shank (e.g., by induction tempering, etc.). The reduced diameter portion 36, 136, 236, 336 also provides additional flexibility relative to a shorter such section, which may be beneficial for improved life for an accessory tool 20, 120, 220, 320.

Although the invention has been described in detail with reference to certain preferred embodiments, variations and modifications exist within the scope and spirit of one or more independent aspects of the invention as described. Various features of the invention are set forth in the following claims.

What is claimed is:

1. An accessory tool comprising:
an adapter end having a maximum outer dimension; and
a shank coupled to the adapter end, the shank including
a tool engagement portion including a cross section having a maximum outer width,
a first reduced portion disposed between the tool engagement portion and the adapter end, the first reduced portion having a first minimum outer dimension and a first length, and
a second reduced portion formed in the tool engagement portion between the first reduced portion and an end of the shank, the second reduced portion configured to be engaged by the tool to secure the shank to the tool, the second reduced portion having a second minimum outer dimension and a second length,
wherein the maximum outer dimension is greater than the maximum outer width, wherein the maximum outer width is greater than the first minimum outer dimension and greater the second minimum outer dimension, and wherein the first length is greater than the second length.

2. The accessory tool of claim 1, wherein the shank defines a third length, and wherein the first length of the first reduced diameter portion is 10% to 45% of the third length.

3. The accessory tool of claim 2, wherein the first length is 10% to 30% of the third length.

4. The accessory tool of claim 1, wherein the adapter end and the shank are integrally formed as a single piece.

5. The accessory tool of claim 1, further comprising a first fillet that is continuous with the adapter end.

6. The accessory tool of claim 5 further comprising a second fillet that is continuous with the shank, wherein the second fillet is angled relative to the first reduced portion within a range of 110° to 140°.

7. The accessory tool of claim 1, wherein the adapter end includes a conically shaped body having a series of stepped shoulders that increase in diameter from a tip portion to a base portion.

8. The accessory tool of claim 1, wherein the first minimum outer dimension is greater than the second minimum outer dimension.

9. An accessory tool comprising:
a first end having a maximum outer diameter; and
a shank coupled to the first end, the shank including
a second end including a cross section having a maximum outer width,
a first reduced portion disposed between the first end and the second end, the first reduced portion having a first minimum outer diameter and a first length, and
a second reduced portion formed in the second end between the first reduced portion and an end of the shank, the second reduced portion configured to be engaged by a tool to secure the shank to the tool, the second reduced portion having a second minimum outer diameter and a second length,
wherein the maximum outer diameter is greater than the maximum outer width, wherein the maximum outer width is greater than the first minimum outer diameter and greater the second minimum outer diameter, wherein the shank defines a third length, and wherein the first length is 10% to 45% of the third length.

10. The accessory tool of claim 9, wherein the first length is greater than the second length.

11. The accessory tool of claim 9, wherein the cross section of the second end is substantially hexagonal.

12. The accessory tool of claim 9, wherein the first minimum outer diameter is greater than the second minimum outer diameter.

13. The accessory tool of claim 9, wherein the first end includes a cylindrical body having a plurality of rounded protrusions extending in a direction away from the body.

14. The accessory tool of claim 12, wherein the body includes an engagement mechanism configured to releasably couple the accessory tool to a socket.

15. A shank for an accessory tool, the shank comprising:
a tool engagement portion including a cross section having a maximum outer width;
a first reduced portion adjacent the tool engagement portion, the first reduced portion having a first minimum outer diameter and a first length;
a second reduced portion formed in the tool engagement portion between the first reduced portion and an end of the shank, the second reduced portion configured to be engaged by a tool to secure the shank to the tool, the second reduced portion having a second minimum outer diameter and a second length; and
a flange positioned on an opposite side of the first reduced portion from the tool engagement portion and configured to be coupled to an effector end of the accessory tool, the flange having a maximum outer diameter,
wherein the maximum outer width of the tool engagement portion is greater than the first minimum outer diameter, greater than the second minimum outer diameter, and less than the maximum outer diameter, and wherein the first length is greater than the second length.

16. The accessory tool of claim 15, wherein the shank defines a third length, and wherein the first length of the first reduced diameter portion is 10% to 45% of the third length.

17. The accessory tool of claim 16, wherein the first length is 10% to 30% of the third length.

18. The tool accessory of claim 15, wherein the cross section of the tool engagement portion is substantially hexagonal.

19. The accessory tool of claim 15, wherein the first minimum outer diameter is greater than the second minimum outer diameter.

20. The shank of claim 15, wherein the flange and the first reduced portion are integrally formed as a single piece, and wherein a fillet forms a continuous transition from the first reduced portion to the flange.

* * * * *